(12) United States Patent
Rho et al.

(10) Patent No.: US 7,982,812 B2
(45) Date of Patent: Jul. 19, 2011

(54) DISPLAY DEVICE

(75) Inventors: Soon-Joon Rho, Suwon-si (KR);
Min-Sik Jung, Seoul (KR); Baek-Kyun Jeon, Yongin-si (KR); Hee-Keun Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 173 days.

(21) Appl. No.: 12/204,725

(22) Filed: Sep. 4, 2008

(65) Prior Publication Data

US 2009/0091689 A1    Apr. 9, 2009

(30) Foreign Application Priority Data

Oct. 9, 2007   (KR) .................. 10-2007-0101525

(51) Int. Cl.
*G02F 1/135*   (2006.01)
(52) U.S. Cl. .......................................... 349/25; 349/30
(58) Field of Classification Search .............. 349/25, 349/30
See application file for complete search history.

(56) References Cited

U.S. PATENT DOCUMENTS

| | | | |
|---|---|---|---|
| 7,217,959 B2 * | 5/2007 | Chen | 257/100 |
| 7,242,030 B2 * | 7/2007 | Wang et al. | 257/89 |
| 7,279,716 B2 * | 10/2007 | Chen | 257/94 |
| 7,746,423 B2 * | 6/2010 | Im et al. | 349/71 |
| 2005/0194608 A1 * | 9/2005 | Chen | 257/100 |
| 2005/0230693 A1 * | 10/2005 | Chen | 257/89 |
| 2006/0145137 A1 * | 7/2006 | Wang et al. | 257/14 |
| 2006/0274226 A1 * | 12/2006 | Im et al. | 349/71 |
| 2009/0102352 A1 * | 4/2009 | Cok et al. | 313/498 |

FOREIGN PATENT DOCUMENTS

| | | |
|---|---|---|
| JP | 08-043814 | 2/1996 |
| KR | 1020060113160 A | 11/2006 |
| KR | 1020060125347 A | 12/2006 |

* cited by examiner

*Primary Examiner* — K. Cyrus Kianni
(74) *Attorney, Agent, or Firm* — Innovation Counsel LLP

(57) ABSTRACT

In a display device, first and second substrates parallel to each other are arranged between first and second polarizers that are parallel to each other. A liquid crystal layer is arranged between the first and second substrates, and a light emitting layer having a quantum dot structure is arranged on the first polarizer. Also, a light source that emits a blue light is arranged under the second polarizer. Thus, the display device may improve a light utilizing efficiency, thereby improving a display quality.

11 Claims, 5 Drawing Sheets

DISPLAY DEVICE

CROSS-REFERENCE TO RELATED APPLICATION

This application claims priority under 35 U.S.C. §119 to Korean Patent Application No. 2007-101525 filed on Oct. 9, 2007, the contents of which are herein incorporated by reference in its entirety.

BACKGROUND OF THE INVENTION

1. Field of the Invention

The disclosure contained herein relates to a display device. More particularly, the disclosure relates to a display device capable of improving light utilizing efficiency.

2. Description of the Related Art

In general, a liquid crystal display is a non-emissive display, so that the liquid crystal display requires a backlight device in order to display images. When the liquid crystal display displays color images, the liquid crystal display includes color filters each arranged in a pixel, such as a red color filter, a green color filter, a blue color filter.

The red, green, and blue color filters transmit a light having a specific wavelength of white light incident from the backlight device to display its color. Accordingly, a light loss is generated in the liquid crystal display by the color filters, and the light loss amount becomes 66.6% of the incident white light.

Thus, in order to display the images having a sufficient brightness, a backlight device having high brightness is required. However, this causes an increase of power consumption, so that the production cost of the liquid crystal display increases.

SUMMARY OF THE INVENTION

The subject matter disclosed herein provides for a high brightness display device capable of improving light utilizing efficiency.

In one embodiment, a display device includes a liquid crystal panel having a liquid crystal layer and a light source disposed under the liquid crystal panel to emit a blue light. The display device includes a light emitting layer disposed on the liquid crystal panel and excited by the blue light exiting through the liquid crystal panel to emit a light having a longer wavelength than the blue light.

The display device includes a first pixel area, a second pixel area, and a third pixel area, and the light emitting layer includes a first color light emitting layer, a second color light emitting layer, and a third color light emitting layer that correspond to the first, second, and third pixel areas in one-to-one fashion. The first, second, and third color light emitting layers include quantum dot phosphors having different sizes from each other.

In another embodiment, a display device includes first and second polarizers arranged parallel to each other, first and second substrates arranged between the first and second polarizers and parallel to each other, a liquid crystal layer arranged between the first and second substrates, a light emitting layer arranged on the first polarizer and having a quantum dot structure, and a light source arranged under the second polarizer and emitting a blue light.

Accordingly, in one embodiment, the display device includes the quantum dot phosphor and the blue color light source as the backlight thereof, thereby improving the light utilizing efficiency without damaging the liquid crystal layer.

BRIEF DESCRIPTION OF THE DRAWINGS

The above and other advantages will become readily apparent by reference to the following detailed description when considered in conjunction with the accompanying drawings wherein.

DESCRIPTION OF THE EMBODIMENTS

Figure 1:
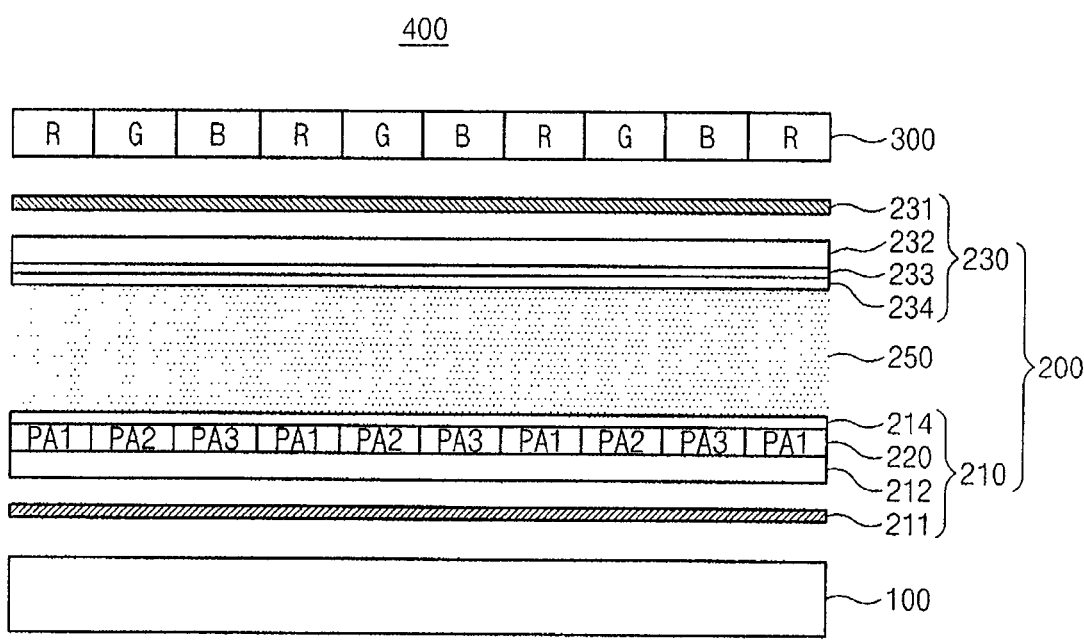
FIG. 1 is a sectional view showing a display device according to one embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the disclosure will be explained in detail with reference to the accompanying drawings.

Prior to describing a structure of a liquid crystal display according to one embodiment, a quantum dot (QD) and an inorganic phosphor will be described below.

The QD (or ND: Nano Dot) indicates a semiconductor quantum dot having a quantum confinement effect and has a diameter of about 1 nm to about 10 nm. When adjusting the size of the QD, a light having a desired wavelength may be obtained from the QD.

That is, various colors including at least red color, green color, and blue color may be readily obtained from the QD according to a quantum size effect of the QD. Thus, LEDs each emitting lights of different wavelengths may be fabricated, and various colors including the white light may be realized by mixing the lights of different wavelengths.

Widely used methods of forming the QD include a chemical wet method or a chemical vapor. The chemical wet method mixes precursors with an organic solvent and grows particles to form the QD. As an example of the QD, a group II-VI compound, such as CdSe, CdTe, CdS, ZnSe, ZnTe, ZnS, HgTe, or HgS, may be used.

Also, the QD may have a core-shell structure. The core comprises at least one selected from the groups consisting of CdSe, CdTe, CdS, ZnSe, ZnTe, ZnS, HgTe, and HgS, and the shell comprises at least one selected from the groups consisting of CdSe, CdTe, CdS, ZnSe, ZnTe, ZnS, HgTe, and HgS. Further, a group III-V compound such as GaN, InAs, GaAs, GaInP may be applied to the core or shell.

FIG. 1 is a sectional view showing a display device according to one embodiment.

Referring to FIG. 1, a display device 400 includes a blue backlight 100, a display panel 200, and a light emitting layer 300.

The display panel 200 includes a rear plate 210, a front plate 230 spaced apart from the rear plate 210 by a predetermined distance, and a liquid crystal layer 250 interposed between the rear plate 210 and the front plate 230.

The front plate 230 includes a first insulating substrate 232, a front polarizer 231 disposed on an outer surface of the first insulating substrate 232, a common electrode 233 disposed on an inner surface of the first insulating substrate 232, and an upper alignment layer 234 disposed on the common electrode 233. The common electrode 233 and the upper alignment layer 234 are sequentially arranged on the inner surface of the first insulating substrate 232.

The rear plate 210 includes a second insulating substrate 212, a rear polarizer 211 disposed on an outer surface of the second insulating substrate 212, a wire layer 220 disposed on an inner surface of the second insulating substrate 212 as a liquid crystal driving circuit including a TFT that serves as a switching device and a pixel electrode, and a lower alignment layer 214 disposed on the wire layer 220.

The light emitting layer 300 includes a red color light emitting layer R, a green color light emitting layer G, and a blue color light emitting layer B and is disposed on the front polarizer 231. The rear plate 210 is defined as first, second, and third pixel areas PA1, PA2, and PA3, and the red color light emitting layer R, the green color light emitting layer G and the blue color light emitting layer B correspond to the first to third pixel areas PA1, PA2, and PA3 in one-to-one fashion.

The light emitting layer 300 includes the quantum dot in a particle or a thin layer, and will be described in detail below.

The rear polarizer 211 is disposed under the rear plate 210 and the blue backlight 100 is disposed under the rear polarizer 211. The rear polarizer 211 has a polarizing axis substantially perpendicular to a polarizing axis of the front polarizer 231.

Figure 2A:
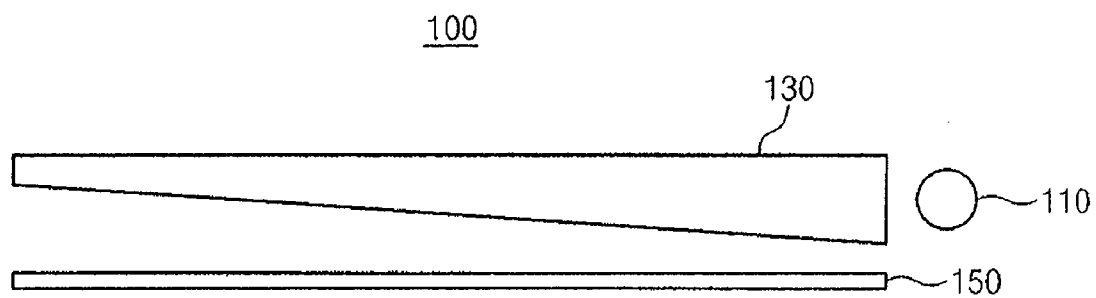
FIG. 2A is a sectional view showing an embodiment of a blue backlight of FIG. 1.
Figure 2B:
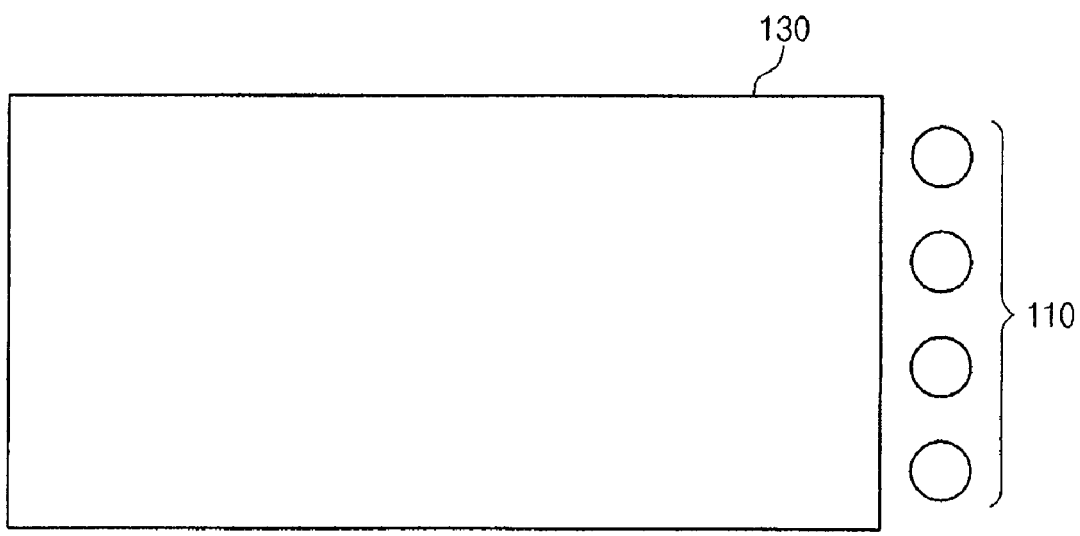
FIG. 2B is a plan view showing the blue backlight of FIG. 2A.

FIG. 2A is a sectional view showing an embodiment of a blue backlight of FIG. 1, and FIG. 2B is a plan view showing the blue backlight of FIG. 2A.

Referring to FIGS. 2A and 2B, the blue backlight 100 disposed under the rear polarizer 211 includes a blue lamp 110, a light guide/diffuse member 130, and a reflecting plate 150. The blue lamp 110 may be a blue LED. The blue lamp 110 is arranged adjacent to one end side of the light guide/diffuse member 130. Accordingly, the light guide/diffuse member 130 receives a blue light emitted from the blue lamp 110 through the one end side thereof and guides the blue light to the rear plate 210. Also, the light guide/diffuse member 130 diffuses the blue light such that the blue light exits from an entire surface thereof in uniform brightness.

The reflecting plate 150 is disposed under the light guide/diffuse member 130 and reflects the blue light leaked from the light guide/diffuse member 130 toward the light guide/diffuse member 130, thereby improving a light utilizing efficiency of the blue backlight 100.

In one embodiment, the light guide/diffuse member 130 may be removed from the blue backlight 100. In case that the light guide/diffuse member 130 is removed from the blue backlight 100, the blue lamp 110 has a size corresponding to the entire surface of the rear plate 210. For instance, the blue lamp 110 may have a structure of which a plurality of LEDs are integratedly arranged in the same plane.

In FIGS. 2A and 2B, a structure that the blue lamp 110 including the LEDs is arranged adjacent to the one end side of the light guide/diffuse member 130 (i.e., an edge lighting manner) has been described. However, the blue lamp 110 including the LEDs may be arranged under the light guide/diffuse member 130.

Figure 3A:
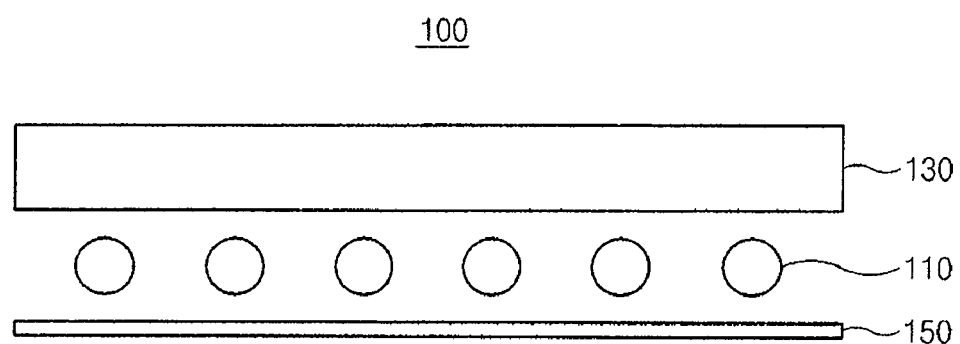
FIG. 3A is a sectional view showing another embodiment of a blue backlight of FIG. 1.
Figure 3B:
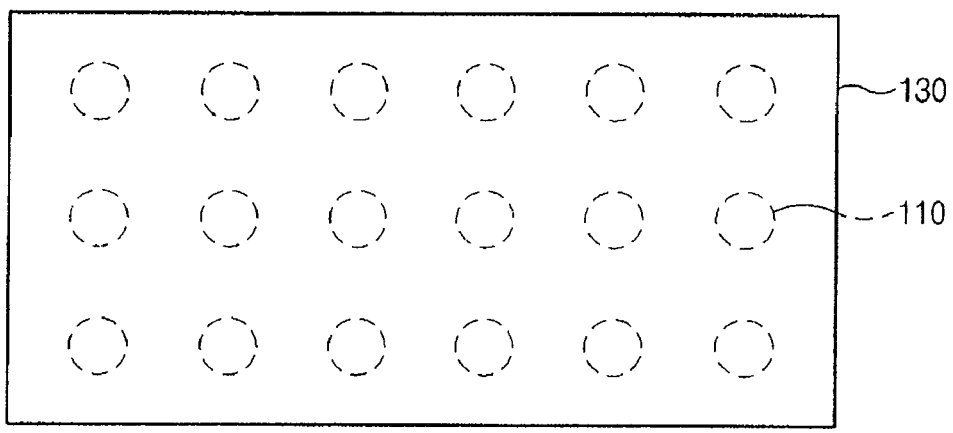
FIG. 3B is a plan view showing the blue backlight of FIG. 3A.

FIG. 3A is a sectional view showing another embodiment of a blue backlight of FIG. 1, and FIG. 3B is a plan view showing the blue backlight of FIG. 3A.

Referring to FIGS. 3A and 3B, in the blue backlight 100 according to another embodiment, the blue lamp 110 includes a plurality of LEDs and is arranged under the light guide/diffuse member 130. The blue lamp 110 is arranged over a lower surface of the light guide/diffuse member 130 to supply the blue light to the light guide/diffuse member 130.

The blue backlight 100 further includes a reflecting plate 150 arranged under the blue lamp 110. The reflecting plate 150 reflects the blue light that is leaked from the blue lamp 110 and not applied to the light guide/diffuse member 130 toward the light guide/diffuse member 130.

Figure 4:
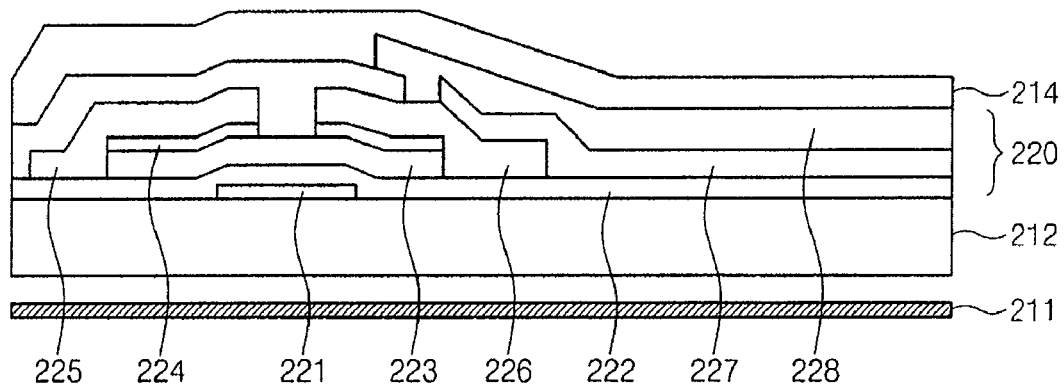
FIG. 4 is a sectional view showing a rear plate of FIG. 1.

FIG. 4 is a sectional view showing a rear plate of FIG. 1.

Referring to FIG. 4, the wire layer 220 including the TFT that serves as the switching device and the pixel electrode connected to the TFT is arranged on the second insulating substrate 212 of the rear plate 210. The TFT has a bottom gate structure where a gate 221 is arranged under a silicon layer 223 and a doped silicon layer 224.

Particularly, the gate 221 is formed on the first insulating substrate 212, and a gate insulating layer 222 is formed on the first insulating substrate 212 to cover the gate 221. The silicon layer 223 and the doped silicon layer 224 are sequentially formed on the gate insulating layer 222 corresponding to the gate 221. Then, a source 225 and a drain 226 are formed on the doped silicon layer 224 and the gate insulating layer 222 and spaced apart from each other. In particular, a portion of the source 225 is overlapped with the doped silicon layer 224 and a remaining portion of the source 225 is overlapped with the gate insulating layer 222. A portion of the drain 226 is overlapped with the doped silicon layer 224 and a remaining portion of the drain 226 is overlapped with the gate insulating layer 222.

A passivation layer 227 is formed on the gate insulating layer 222 to cover the source 225 and the drain 226. The passivation layer 227 is provided with a contact hole through which a portion of the drain 226 is exposed. A pixel electrode 228 including a transparent conductive material such as indium tin oxide (ITO), indium zinc oxide (IZO) is formed on the passivation layer 227. The pixel electrode 228 is electrically connected to the drain electrode 226 through the contact hole formed through the passivation layer 227. Then, the lower alignment layer 214 is formed on the passivation layer 227 and the pixel electrode 228 to align the liquid crystal molecules LC.

Hereinafter, the quantum dot will be described in detail.

The quantum dot has a semiconductor nano-structure where movements of electrons in conduction band and holes in valence band are limited to all directions. In general, the quantum dot has a size of about 1 nm to about 10 nm, in this case, the wave function of an electron is quantized, so that the electron has a discrete energy level as a monatomic case. However, since the energy level and the band gap of the electron depend on the size of the quantum dot, the emission energy of the electron (i.e., the wavelength of the self-emission) is varied after the electron is excited. When using the characteristic of the quantum dot as described above, the colors may be realized through the quantum dot without the color filters.

Figure 5:
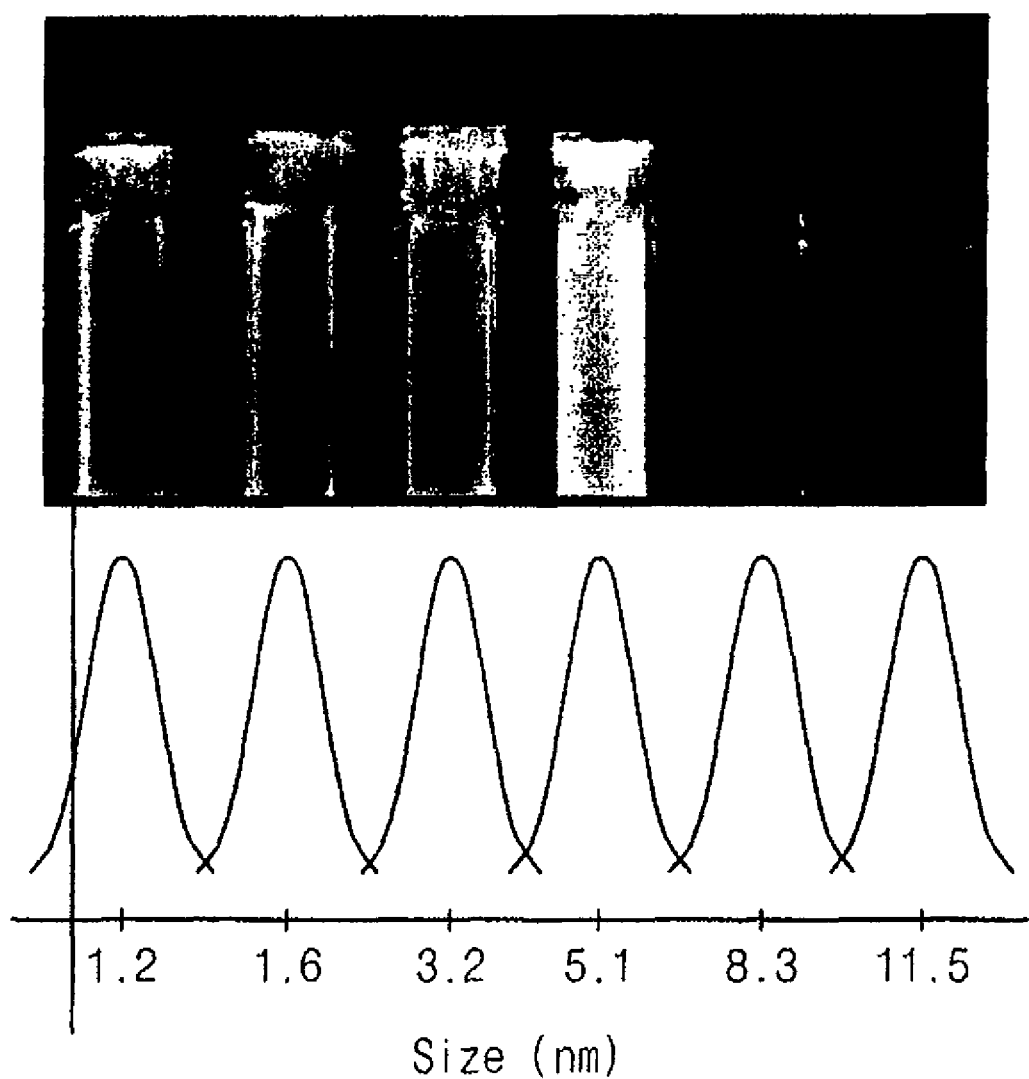
FIG. 5 is a view showing self-emission characteristics according to a size of a quantum dot.

FIG. 5 is a view showing self-emission characteristics according to a size of a quantum dot. In FIG. 5, variations of the self-emission of the quantum dot made from CdSe are represented according to the size of the quantum dot.

Referring to FIG. 5, when the size of the quantum dot is small, the self-emission color of the quantum dot is shown in blue color. As the size of the quantum dot increases further, the self-emission color of the quantum dot is closer to red color. Thus, when adjusting the size of quantum dot, various light emitting layers such as the red color light emitting layer R, the green color light emitting layer G, the blue color light emitting layer B (shown in FIG. 1) may be formed. Also, the light utilizing efficiency of the quantum dot phosphor is almost 100%, thereby providing a display device having the higher brightness than that of a conventional display device employing a conventional color filter.

The quantum dot may comprise a material selected from the groups consisting of a group II-VI compound, a group III-V compound, a group IV-VI compound, a group IV compound, and mixtures of these groups.

The group II-VI compound comprises a material selected from the groups consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, Hgg- ZnTe, CdZnSeS, CdZnSeTe, CdZnSTe, CdHgSeS, CdHgSeTe, CdHgSTe, HgZnSeS, HgZnSeTe, and HgZnSTe.

The group III-V compound comprises a material selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb.

The group IV-VI compound comprises a material selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe.

The group IV compound comprises a material selected from the group consisting of Si, Ge, SiC, and SiGe.

In one embodiment, the display device 400 has been described as an active-driving type display device employing the TFTs, however, this is not limiting and other structures may be utilized with the display device 400. For example, the display device 400 may be applied to a matrix type structure without adopting the switching device. Such display devices 400 may be include a liquid crystal panel operated in a twisted nematic (TN) mode, a vertical alignment (VA) mode, or an in-plane switching (IPS) mode.

According to the above, the display device includes the quantum dot phosphor in lieu of the color filter and includes the blue color light source as the backlight thereof, thereby improving the light utilizing efficiency without damaging the liquid crystal layer.

Although various embodiments have been described, it is understood that various changes and modifications can be made by one ordinary skilled in the art within the spirit and scope of the disclosed subject matter as hereinafter claimed.

What is claimed is:

1. A display device comprising:
   a liquid crystal panel comprising a liquid crystal layer;
   a light source disposed under the liquid crystal panel to emit a blue light; and
   a light emitting layer disposed on the liquid crystal panel and excited by the blue light exiting through the liquid crystal panel to emit a light having a longer wavelength than the blue light,
   wherein the liquid crystal panel comprises a first pixel area, a second pixel area, and a third pixel area,
   the light emitting layer comprises a first color light emitting layer, a second color light emitting layer, and a third color light emitting layer that are corresponding to the first, second, and third pixel areas in a one-to-one fashion, and
   the first, second, and third color light emitting layers comprise quantum dot phosphors having different quantum dot sizes from each other to emit different color light from each other.

2. The display device of claim 1, wherein each of the quantum dot phosphors comprises a material selected from the group consisting of a group II-VI compound, a group III-V compound, a group IV-VI compound, a group IV compound, and a mixture consisting of the compounds.

3. The display device of claim 2, wherein the group II-VI compound comprises a material selected from the groups consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

4. The display device of claim 2, wherein the group III-V compound comprises a material selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb.

5. The display device of claim 2, wherein the group IV-VI compound comprises a material selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe, and the group IV compound comprises a material selected from the group consisting of Si, Ge, SiC, and SiGe.

6. The display device of claim 1, further comprising:
a first polarizer disposed on the liquid crystal panel; and
a second polarizer disposed under the liquid crystal panel,
wherein the first polarizer has a polarizing axis substantially perpendicular to a polarizing axis of the second polarizer.

7. The display device of claim 6, wherein the liquid crystal panel is operated in a twisted nematic (TN) mode, a vertical alignment (VA) mode, or an in-plane switching (IPS) mode.

8. The display device of claim 6, wherein the light emitting layer is arranged on the first polarizer and the light source is arranged under the second polarizer.

9. The display device of claim 1, wherein the light source comprises a light emitting diode (LED).

10. The display device of claim 1, wherein the light emitting layer comprises a first light emitting layer, a second light emitting layer, a third light emitting layer that have different colors from each other.

11. The display device of claim 10, wherein the first, second, and third color light emitting layers comprise quantum dot phosphors having different sizes from each other.

* * * * *